United States Patent [19]

Jungle

[11] 3,855,445
[45] Dec. 17, 1974

[54] DEVICE FOR INTERCONNECTING TWO PLATES

[75] Inventor: Nils Ake Curt Jungle, Goteborg, Sweden

[73] Assignee: AB Gotaverken, Goteborg, Sweden

[22] Filed: Nov. 14, 1973

[21] Appl. No.: 415,903

[30] Foreign Application Priority Data
Dec. 7, 1972 Sweden............................ 15931/72

[52] U.S. Cl.............................. 219/121 EB, 219/72
[51] Int. Cl......................... B23k 15/00, B23k 9/16
[58] Field of Search................... 219/72, 74, 121 EB

[56] References Cited
UNITED STATES PATENTS

| | | |
|---|---|---|
| 2,950,378 | 8/1960 | Tuthill ................................ 219/74 |
| 2,981,824 | 4/1961 | Kitrell .............................. 219/74 X |
| 3,301,993 | 1/1967 | Boyd et al.......................... 219/72 X |
| 3,529,122 | 9/1970 | Hinrichs............................. 219/72 X |
| 3,626,142 | 12/1971 | King.................................. 219/72 X |
| 3,748,432 | 7/1973 | Bosworth et al.............. 219/121 EB |

*Primary Examiner*—J. V. Truhe
*Assistant Examiner*—Kenneth Hairston
*Attorney, Agent, or Firm*—Holman & Stern

[57] ABSTRACT

When welding together two plates it is sometimes desirable to cover the seam by a channel member in order to exclude air. The channel member here includes two parallel and spaced apart beams having juxtaposed and overlapping fins of pliable material which close the space between the beams. The head piece of the welding apparatus is movable between the beams, and will during its movements locally open up the fins, which, however, tightly enclose the head piece to prevent the entrance of air.

3 Claims, 2 Drawing Figures

PATENTED DEC 17 1974

3,855,445

DEVICE FOR INTERCONNECTING TWO PLATES

BACKGROUND OF THE INVENTION

Many welding operations have to be performed under vacuum, or in the presence of an inert gas. The provision of an easily applicable protecting device at the welding joint between two big plates has caused much trouble.

One of the difficulties in arranging a suitable enclosure is caused by the fact that it, especially with an electron beam welding appratus, is desirable to use as short a cable as possible between the actual welding head and the main portion of the apparatus, including for instance the transformer. The enclosed space must, for practical reasons, be made as small as possible, and the high power required makes it difficult to arrange the current supply in a suitable manner. When welding together two big plates it is common to mount the welding apparatus on a carrier traversing the plates, and a channel shaped member is used to cover the seam on top of as well as below the plates. The space between these channel shaped member is connected to an air extractor.

SUMMARY OF THE INVENTION

The invention is characterized in that the channel shaped member to be used on top of the plates includes two parallel beams, located at some distance from each other and connected to pressure fluid operated rams fitted at the carrier for movement in the vertical direction, each beam being provided with a laterally directed fin of pliable material, said fins overlapping each other to fully cover the space between the beams, and being sufficiently deformable to permit the head piece of the welding apparatus to move longitudinally between the beams, without causing any noticeable entrance of air.

DESCRIPTION OF THE PREFERRED EMBODIMENT

Figure 1:
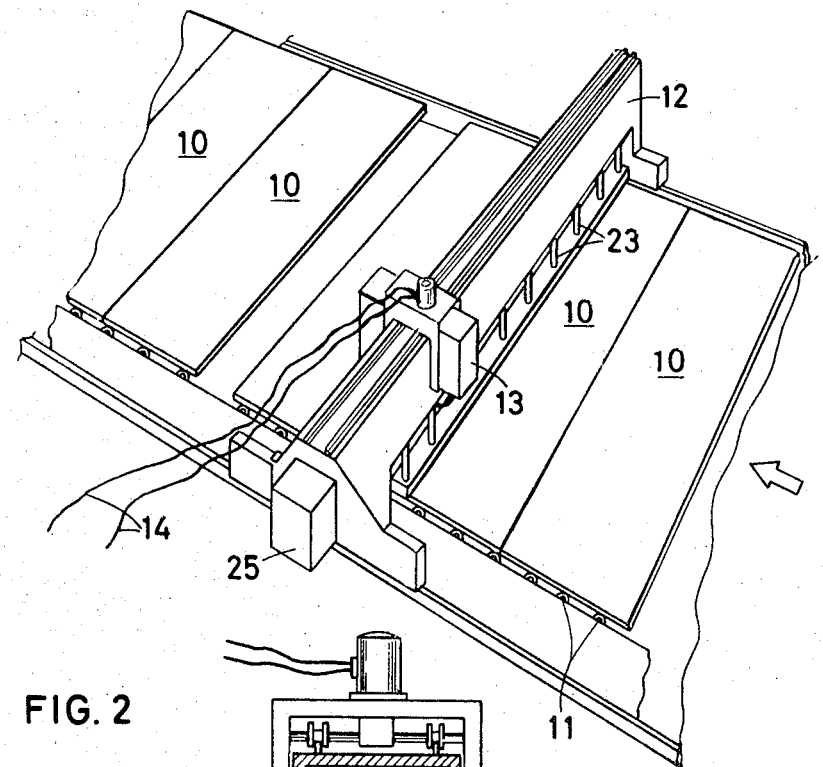
FIG. 1 is a perspective view of a device for interconnecting big plates.
Figure 2:
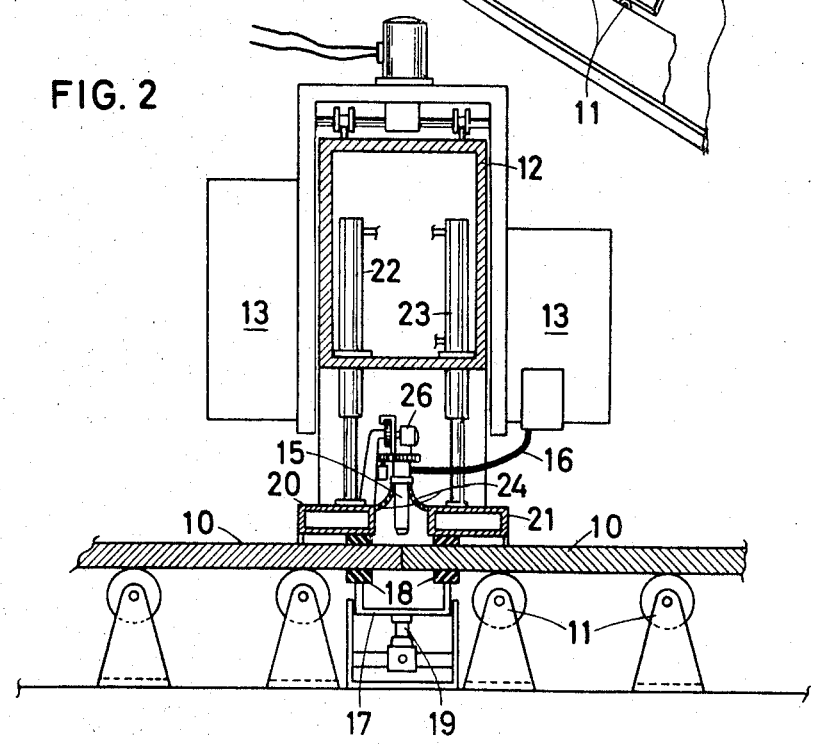
FIG. 2 is a cross section through the device.

The device is intended for interconnecting big plates 10 by means of electron beam welding. The plates are moved along a roller track 11 to the welding apparatus, which is mounted on a carrier 12 straddling the roller track. The welding apparatus, generally denoted by 13, is mounted on the carrier in such a manner that it can be displaced longitudinally thereof, i.e., across the roller track. The basic supply of current to this welding apparatus, which includes a transformer, occurs by means of cables 14 and causes no problems.

The actual head 15 of the welding apparatus is located close by the welding seam, and is connected to the main part of the welding apparatus by means of a second cable 16. It is of highest importance that this second cable, which transfers the transformed current, be made very short. The welding head, thus, is located directly below the main portion of the welding apparatus, and is moved in step with the latter.

When using an electron beam welding apparatus it is necessary to operate with at least a partial vacuum around the seam, and the latter is therefore enclosed by a shielding means. Below the roller track there is a first channel shaped member 17 provided with sealing means 18 for engagement with the under sides of the plates. This channel member is operable up and down by means of a number of pressure fluid rams 19.

A corresponding shielding device is provided above the plates and includes two parallel beams 20, 21 provided with sealing means for engagement with the plates. The beams are located at some distance from each other and are designed to be operated up and down by means of a number of pressure fluid rams 22, 23. Each beam 20, 21 is provided with a laterally directed fin 24 of pliable material. These fins have such a breadth that they overlap each other, and they will in this manner fully close the space between the two beams and between those and the plates.

The spaces enclosed in this manner, above as well as below the plates, are connected to an air extractor 25, not shown in detail, which can bring about a partial vacuum within said spaces.

The fins 24 are sufficiently pliable to permit the welding head 15 to be moved along the seam to be made, and they will engage the head in such a manner that an unsatisfactory entrance of air is prevented.

As mentioned above it is essential that cable 16 be as short as possible. The welding head 15 is mounted at beam 20 and is moved along the latter, in step with the main part of the welding apparatus 13, by an apparatus 26 of arbitrary design. The beams of the upper channel member are sucked towards the plates by the sub-pressure in the enclosed space, but the pressure in rams 22 and 23 ought to be maintained during operation. In order to make possible the passages of cable 16 along the carrier the piston rods of rams 23 will have to be lifted. This preferably occurs in step with the movement of the welding apparatus, and each ram is re-applied as soon as the cable has passed, so a safe location of the channel member is maintained. Ram 23 and beam 21 must, of course, be releasably connected together in a known manner.

What I claim is:

1. In a device for interconnecting two horizontally arranged plates including a carrier straddling the plates, a welding apparatus having a main part and a head piece movable along said carrier, a channel shaped member for covering the welding seam on top of, as well as below the plates and an air extractor connected to the space between the channel shaped members, the improvement that the channel shaped member to be used on top of the plates includes first and second parallel beams located at some distance from each other, as well as a laterally directed fin or pliable material at each beam, said fins overlapping each other to fully cover the distance between the beams and being sufficiently deformable to permit the head piece of the welding apparatus to move longitudinally between the beams, without causing any noticeable entrance of air, the head piece forming part of an electron beam welding apparatus and being carried by the second beam, and first and second sets of pressure fluid operated rams fitted at the carrier for moving each of said beams towards and away from the plates.

2. In a device for interconnecting two horizontally arranged plates including a carrier straddling the plates, a welding apparatus having a main part and a head piece movable along said carrier, a channel shaped member for covering the welding seam on top of, as well as below the plates and an air extractor connected to the space between the channel shaped members, the improvement that the channel shaped member to be used on top of the plates includes first and second parallel beams located at some distance from each other, as well as a laterally directed fin of pliable material at each beam, said fins overlapping each other to fully cover the distance between the beams and being sufficiently deformable to permit the head piece of the welding apparatus to move longitudinally between the beams, without causing any noticeable entrance of air and first and second sets of pressure fluid operated rams fitted at the carrier for moving each of said beams towards and away from the plates, the main part of the welding apparatus being located at the carrier, outside the sets of rams and the welding head piece being mounted between the sets of rams at the two beams, movable in step with the main part of the apparatus and connected to the latter by means of a short cable.

3. A device according to claim 2, in which the welding head piece forms part of an electron beam welding apparatus, and is carried by the second beam.

* * * * *